(12) United States Patent
Fujii et al.

(10) Patent No.: US 10,268,430 B2
(45) Date of Patent: Apr. 23, 2019

(54) INFORMATION PROCESSING DEVICE FOR CONTROLLING JOB HISTORY TO CONTROL AN OPERATION ON A FILE GENERATED BY EXECUTION OF A JOB AND NON-TRANSITORY MEDIUM

(71) Applicant: FUJI XEROX CO., LTD., Tokyo (JP)

(72) Inventors: Hideo Fujii, Kanagawa (JP); Seiji Inoue, Kanagawa (JP); Norihiko Tsuyuzaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/689,070

(22) Filed: Aug. 29, 2017

(65) Prior Publication Data

US 2018/0253272 A1 Sep. 6, 2018

(30) Foreign Application Priority Data

Mar. 2, 2017 (JP) ................ 2017-039338

(51) Int. Cl.
*G06F 3/12* (2006.01)
*H04N 1/00* (2006.01)

(52) U.S. Cl.
CPC ............ *G06F 3/1273* (2013.01); *G06F 3/121* (2013.01); *G06F 3/1204* (2013.01); *G06F 3/1258* (2013.01); *H04N 1/00411* (2013.01); *G06F 3/1286* (2013.01)

(58) Field of Classification Search
CPC .... G06F 3/1273; G06F 3/1204; G06F 3/1258; G06F 3/1286; H04N 1/00411
USPC ................ 358/1.1–1.18, 474, 402
See application file for complete search history.

(56) References Cited

U.S. PATENT DOCUMENTS

| | | | | |
|---|---|---|---|---|
| 2010/0296123 A1* | 11/2010 | Maruyama | ............... | G06F 3/121 358/1.15 |
| 2011/0016164 A1* | 1/2011 | Maeshima | .......... | G06F 17/3028 707/813 |
| 2015/0227821 A1* | 8/2015 | Komazawa | ........ | G06K 15/1823 358/1.2 |
| 2016/0334744 A1* | 11/2016 | Nogami | .................. | G06F 3/121 |

FOREIGN PATENT DOCUMENTS

| | | |
|---|---|---|
| JP | 2011-186527 A | 9/2011 |
| JP | 2015-119251 A | 6/2015 |

\* cited by examiner

*Primary Examiner* — Gabriel I Garcia
(74) *Attorney, Agent, or Firm* — Oliff PLC

(57) ABSTRACT

An information processing device includes a controller that references a job history to control an operation on a file generated by execution of a job.

10 Claims, 7 Drawing Sheets

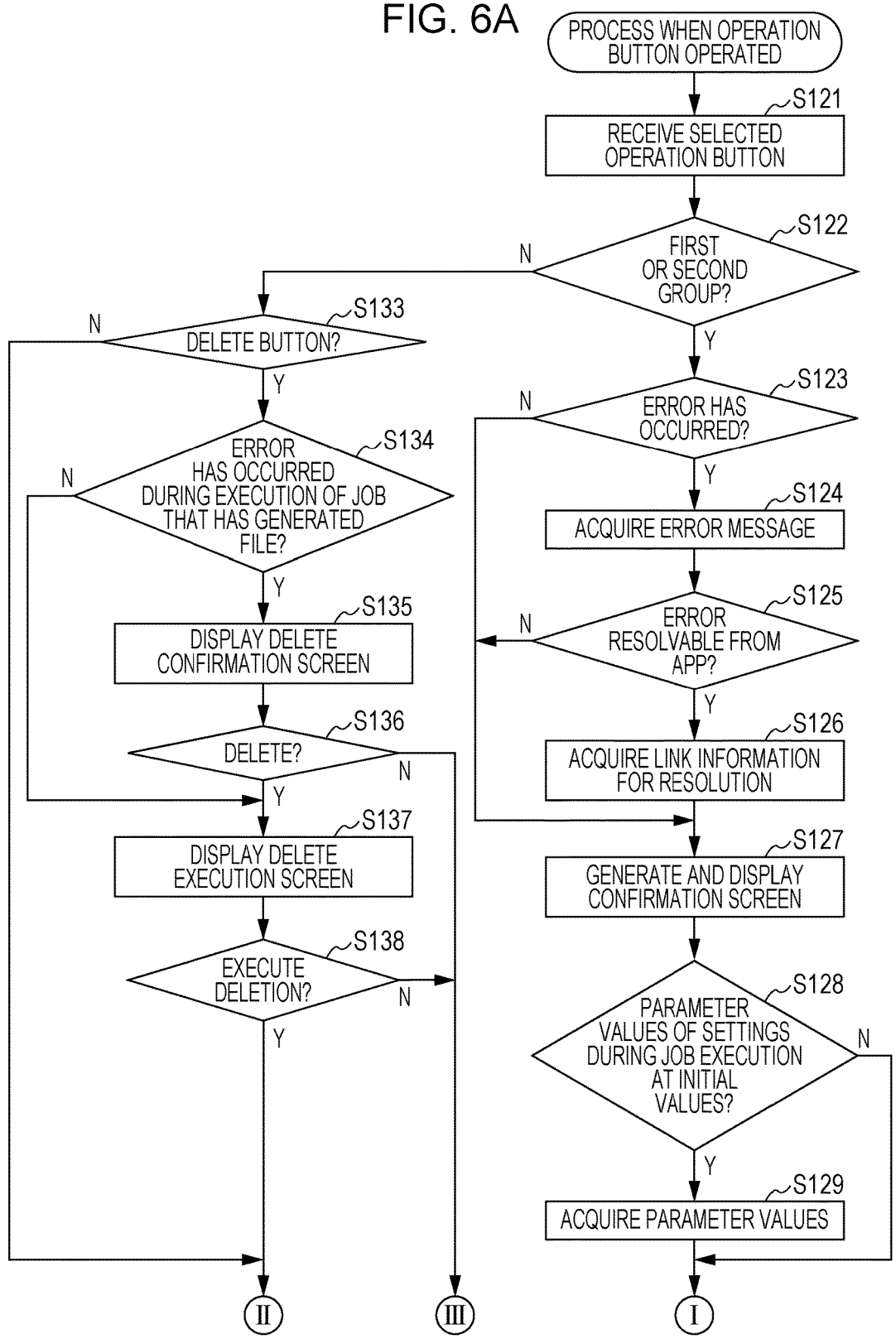

FIG. 9

THE PRINT PROCESS FAILED DURING FILE GENERATION.
PROCEED WITH DELETE PROCESS?

YES    NO

FIG. 10

THE FOLLOWING FILE WILL BE DELETED.

⇒ ccc

DELETE    CANCEL

INFORMATION PROCESSING DEVICE FOR CONTROLLING JOB HISTORY TO CONTROL AN OPERATION ON A FILE GENERATED BY EXECUTION OF A JOB AND NON-TRANSITORY MEDIUM

CROSS-REFERENCE TO RELATED APPLICATIONS

This application is based on and claims priority under 35 USC 119 from Japanese Patent Application No. 2017-039338 filed Mar. 2, 2017.

BACKGROUND

Technical Field

The present invention relates to an information processing device and a non-transitory medium.

SUMMARY

According to an aspect of the invention, there is provided an information processing device including a controller that references a job history to control an operation on a file generated by execution of a job.

BRIEF DESCRIPTION OF THE DRAWINGS

An exemplary embodiment of the present invention will be described in detail based on the following figures, wherein:

FIG. 6A is a flowchart illustrating a process when an operation button is operated according to an exemplary embodiment;

FIG. 9 is a diagram illustrating an example of a delete confirmation screen according to an exemplary embodiment; and FIG. 10 is a diagram illustrating an example of a delete execution screen according to an exemplary embodiment.

DETAILED DESCRIPTION

Hereinafter, a suitable exemplary embodiment of the present invention will be described on the basis of the drawings.

Figure 1:
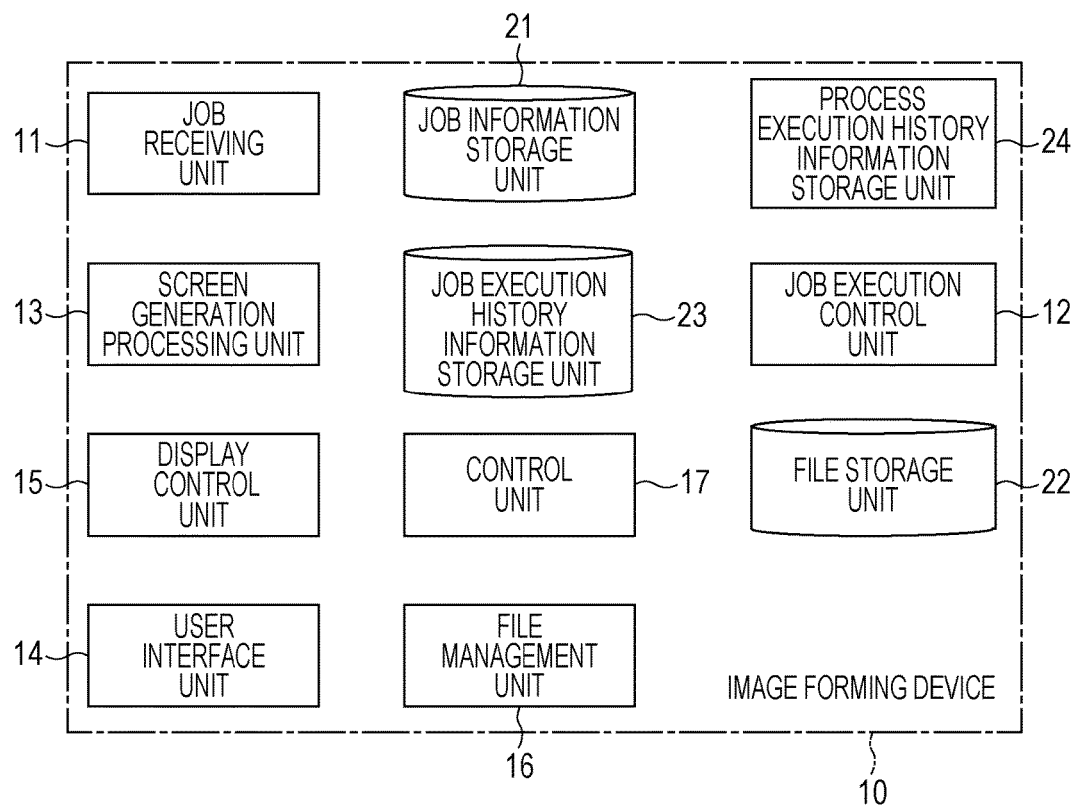
FIG. 1 is a block configuration diagram illustrating an image forming device according to an exemplary embodiment.

FIG. 1 is a block configuration diagram illustrating an image forming device according to an exemplary embodiment. The image forming device 10 according to the exemplary embodiment is a device equipped with an information processing device (computer) according to the present invention.

Figure 2:
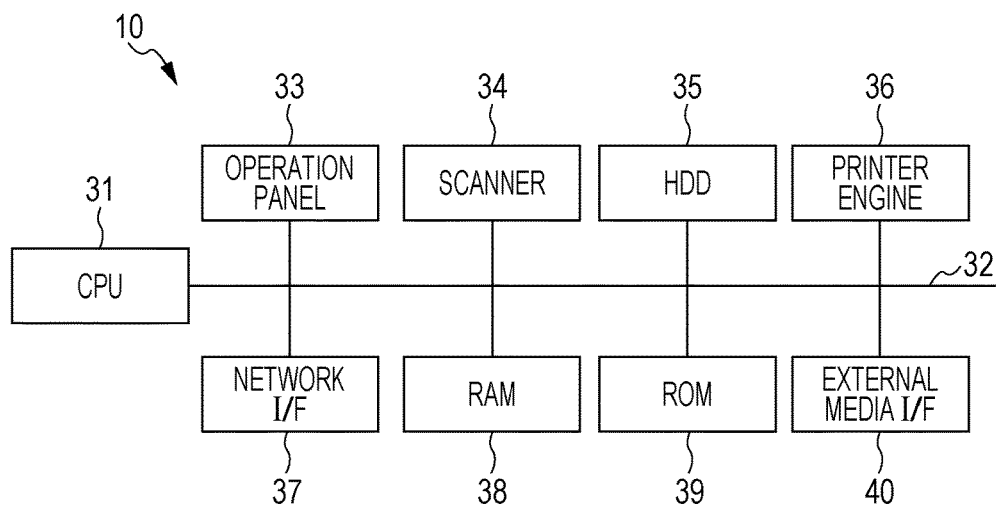
FIG. 2 is a hardware configuration diagram of an image forming device according to an exemplary embodiment.

FIG. 2 is a hardware configuration diagram of an image forming device according to the exemplary embodiment. The image forming device 10 is a multi-function device provided with various functions, such as a copy function and a scanner function, and is a device that includes a built-in computer. In FIG. 2, a CPU 31 follows a program stored in ROM 39 to control the operations of various mechanisms installed in the device itself, such as a scanner 34 and a printer engine 36. An address data bus 32 connects to the various mechanisms under the control of the CPU 31 and conducts data communication. An operation panel 33 accepts instructions from a user, and displays information. The scanner 34 scans documents set by the user, and stores scanned documents in a hard disk drive (HDD) 35 or the like as digital data. The HDD 35 stores information such as digital documents scanned using the scanner 34. The printer engine 36 prints images onto output sheets by following instructions from a control program executed by the CPU 31. A network interface (I/F) 37 connects to a network (not illustrated), and is used for actions such as transmitting and receiving digital data, receiving electronic mail and jobs transmitted to the device, and providing access to the device itself through a browser. RAM 38 is used as a work memory during the execution of a program, and as a transmission buffer during the transmitting and receiving of digital data. ROM 39 stores various programs related to the control of the device, the encryption of digital data, and the transmitting and receiving of digital data. By executing various programs, each of the structural elements described later exhibits a certain processing function. An external media interface (I/F) 40 is an interface with external memory devices such as USB memory and flash memory.

Returning to FIG. 1, the image forming device 10 according to the exemplary embodiment includes a job receiving unit 11, a job execution control unit 12, a screen generation processing unit 13, a user interface unit 14, a display control unit 15, a file management unit 16, a control unit 17, a job information storage unit 21, a file storage unit 22, a job execution history information storage unit 23, and a process execution history information storage unit 24. Note that in FIG. 1, structural elements not used in the description of the exemplary embodiment are omitted from FIG. 1.

The job receiving unit 11 receives a job to execute in the image forming device 10, and registers job information related to the job in the job information storage unit 21. The job information includes information such as the time of receiving the job, the job owner, processes included in the job, and the job itself or information about the job storage location.

The job execution control unit 12 executes a job from a user and also controls the execution of the job. With the recent increase in the complexity of customer demands, jobs often include multiple processes. For example, some kind of process is executed on a file transmitted over a network or a file generated by a scan, and a file including the result of executing the process is generated. Subsequently, the generated file is printed, transmitted by electronic mail, or registered in a certain storage location. In this way, a job is made up of a series of processes. In the present exemplary embodiment, a job is described as including a process of generating a file in particular. Also, the job execution control unit 12 is not necessarily limited to execution in units of jobs, and is also capable of execution in units of processes included in a job.

The screen generation processing unit 13 generates screens to display on an operation panel 33, such as a file operation screen, a parameter setting screen, and a confirmation screen, which will be described later. Additionally, the screen generation processing unit 13 functions as a query unit that queries the user about whether or not to use parameter values set during the execution of a process corresponding to an operation element selected by the user from the file operation screen as initial values. An operation element is a graphical user interface (GUI) element such as an operation button, for example. In the following description, an operation button will be described as an example.

The user interface unit 14 corresponds to the operation panel 33, and displays various screens, such as screens generated by the screen generation processing unit 13, and screens prepared in advance by the system. The user interface unit 14 also receives user input operations from the various screens displayed. The display control unit 15 controls the displays of various screens on the user interface unit 14, such as screens generated by the screen generation processing unit 13. The file management unit 16 conducts file management, such as updating and deleting files registered in the file storage unit 22 by the execution of jobs.

The control unit 17 functions as a controller that references a job history to control operations on files generated by the execution of jobs. The job history is included in the job execution history information storage unit 23 and the process execution history information storage unit 24.

The file storage unit 22 stores files generated by the execution of processes included in jobs. The job execution history information storage unit 23 accumulates history information based on the execution of jobs. Specifically, information such as the job owner, the job type, the execution time, processes included in the job, the execution result (normal/abnormal) for each process, and the file name of the file generated by the execution of each process is included in association with job identification information (a job ID). If an operation button corresponding to a process for which an error occurred during the execution of a job is selected from the file operation screen, and this selection causes the process to be executed and end normally, an indication that the process has ended normally is stored in the process execution history information storage unit 24. Note that in a case in which a process included in a job does not end normally, an indication that the process has not ended normally is recorded in the job execution history information storage unit 23 as an execution result. However, in a case in which the process ends normally when executed after the execution of the job, an indication that the process has ended normally is recorded in the process execution history information storage unit 24, without being recorded in the job execution history information storage unit 23.

The structural elements 11 to 17 in the image forming device 10 are realized by cooperative action between the computer provided in the image forming device 10 and a program running on the CPU 31 provided in the computer. Also, the storage units 21 to 24 are realized by the HDD 35 provided in the image forming device 10. Alternatively, the RAM 38 may be used, or an external storage unit may be used over a network.

In addition, a program used in the exemplary embodiment obviously may be provided via a communication medium, and may also be provided by being stored on a computer-readable recording medium such as USB memory. A program provided from a communication medium or a recording medium is installed onto the computer, and various processes are realized by having the CPU 31 of the computer sequentially execute the program.

Next, operations according to the exemplary embodiment will be described.

In the image forming device 10 according to the present exemplary embodiment, when the job receiving unit 11 receives a job, job information about the job is registered in the job information storage unit 21. Subsequently, the job execution control unit 12 executes the job on the basis of the job information. Subsequently, if a file including a result of executing processes included in the job is generated, the file is stored in the file storage unit 22. Information about the execution of a job executed in this way is accumulated in the job execution history information storage unit 23 as job execution history information. The image forming device 10 executes jobs in this way, and accumulates a job history.

Meanwhile, in the course of executing a job, in some cases, a file for saving the result of executing a process included in the job may be conducted normally, but although the file is generated, a subsequent process performed on the file may not end normally for some reason. For example, in the case in which the process to perform on the file is a printing process, the printing process itself may not end normally due to being out of paper or the like. Alternatively, cases in which a job ends abnormally because of an error occurring during the execution of a process prior to the printing process are also relevant. In this way, the cases in which a process included in a job does not end normally encompass cases in which an error occurs in the process itself, and cases in which the job ends abnormally before the process, and the process itself is not executed.

Additionally, even in cases in which a process performed on a file is executed normally, executing the process again may be desirable in some cases. In this way, the case of "executing" a process in the present exemplary embodiment encompasses not only cases in which the process is executed during the execution of the job, but also cases in which the process is executed for the first time or executed again as a result of a corresponding operation button being selected from the file operation screen described later.

Figure 3:
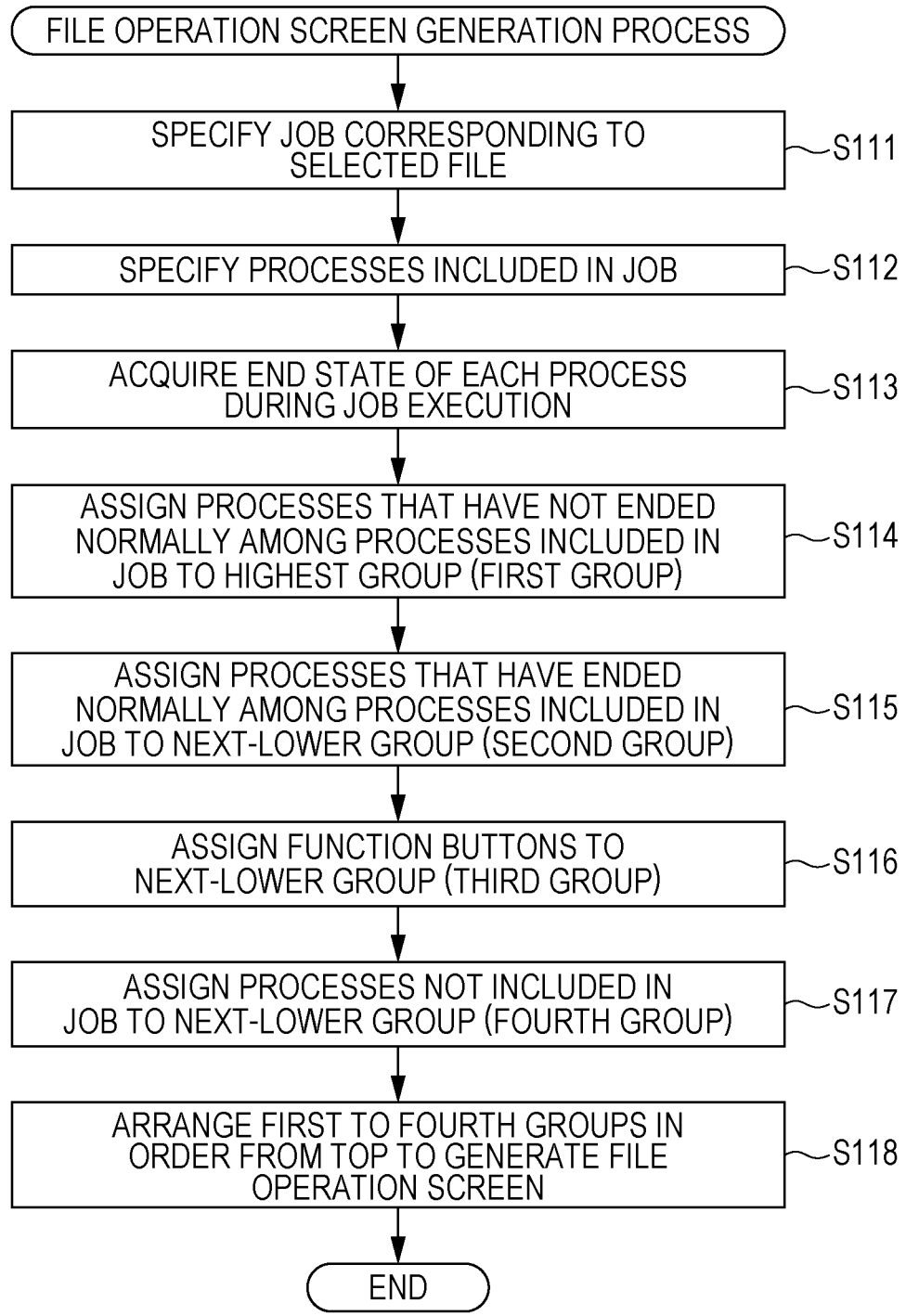
FIG. 3 is a flowchart illustrating a file operation screen generation process according to an exemplary embodiment.

In a case of desiring to execute a process included in a job for some reason, the user causes a file operation screen to be displayed, and selects an operation button corresponding to the desired process from the file operation screen. Note that the file operation screen may be displayed on the operation panel 33 of the image forming device 10, or may be displayed by a browser function on the screen of a terminal carried by the user. In the present exemplary embodiment, the case of displaying the file operation screen on the operation panel 33 of the image forming device 10 will be described as an example. One feature of the present exemplary embodiment is to control operations on a file by referencing the job history and generating a file operation screen in accordance with the job execution result. Hereinafter, a file operation screen generation process according to the present exemplary embodiment will be described using the flowchart illustrated in FIG. 3. Note that the description herein presupposes that multiple jobs have already been executed, and multiple files including an execution result for each job have been generated.

Figure 4:
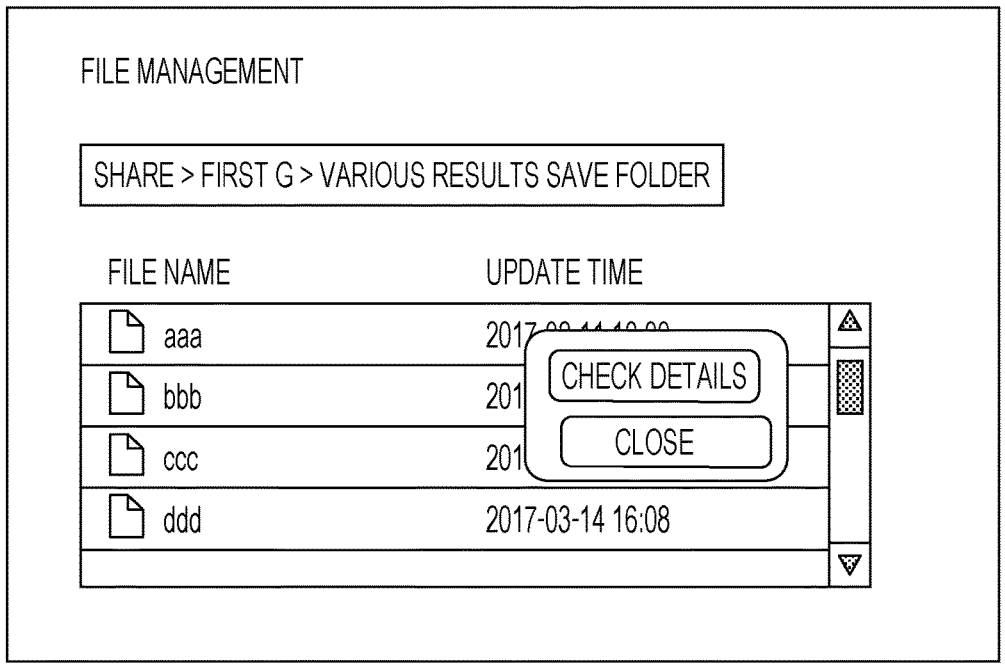
FIG. 4 is a diagram illustrating an example of a file management screen according to an exemplary embodiment.

In a case in which a user wants to perform an operation on a file, the user operates the operation panel 33 to cause a certain file management screen to be displayed. FIG. 4 illustrates an example of the displayed file management screen. Subsequently, the user causes a list of files being stored in a desired folder (in FIG. 4, the "various results save folder") to be displayed, and selects a desired file to use from the list. FIG. 4 illustrates an example in which "bbb" has been selected. When the user selects a file, a sub-screen including operation buttons is displayed on the operation panel 33. When the user selects a Check Details button from the sub-screen, the screen generation processing unit 13 searches the job execution history information storage unit 23 for the name of the selected file, and specifies the job that has generated the selected file (step 111). Next, the screen generation processing unit 13 searches the job information storage unit 21 for the name of the specified job, and specifies the processes included in the specified job (step 112). In addition, the screen generation processing unit 13 references the job execution history information storage unit 23, and ascertains whether or not each specified process has ended normally during the job execution, or in other words, acquires the end state of each specified process (step 113).

Figure 5:
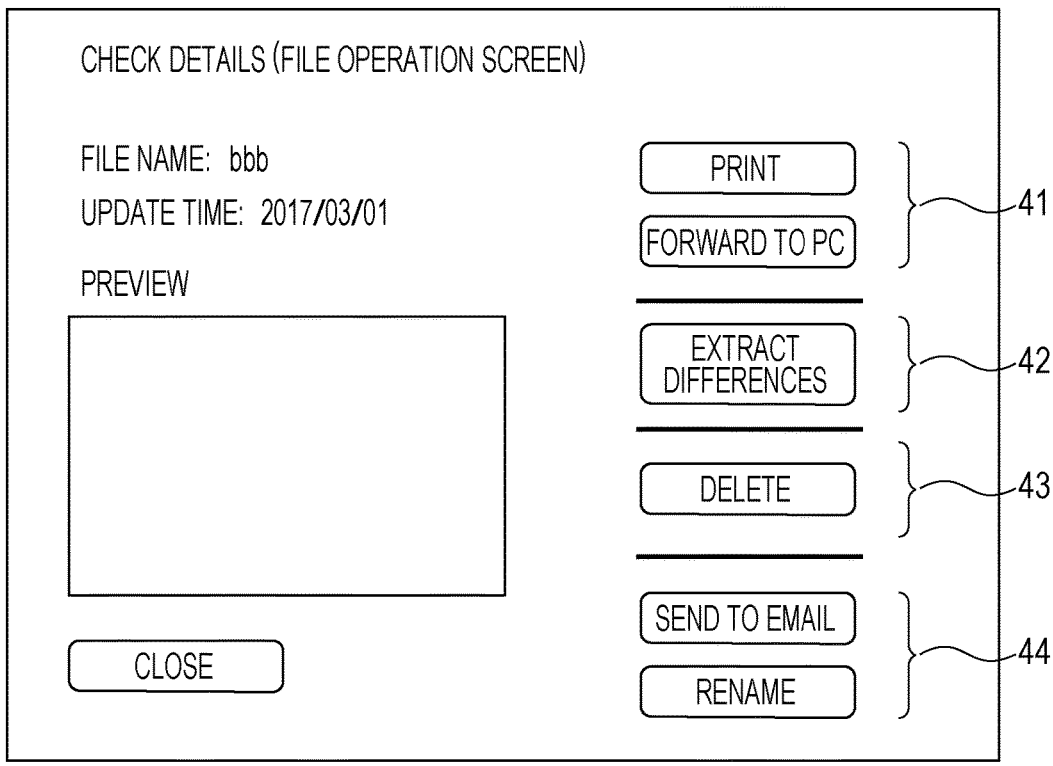
FIG. 5 is a diagram illustrating an example of a file operation screen according to an exemplary embodiment.

Meanwhile, the purpose of the file operation screen generation process according to the present exemplary embodiment is to generate a file operation screen corresponding to a file selected by the user. FIG. 5 illustrates an example of a generated file operation screen. To generate such a file operation screen, in the present exemplary embodiment, a file operation screen that acts as a base (hereinafter, the "base screen") is prepared in advance. The base screen includes operation buttons for executing operations on a file, such as printing or sending to email, and operations for managing files, such as moving or deleting a file (hereinafter also designated "function buttons"), which are pre-arranged on the base screen. In the past, a file operation screen corresponding to the base screen is displayed irrespectively of the selected file, but a feature of the present exemplary embodiment is that the placement and order of the operation buttons included on the base screen are customized in accordance with the selected file.

In other words, the screen generation processing unit 13 assigns the operation buttons corresponding to processes that have not ended normally from among the processes included in the job specified in step 111 to a most-superior group (first group) (step 114). Next, the screen generation processing unit 13 assigns the operation buttons corresponding to processes that have ended normally from among the processes included in the job to the next group (second group) (step 115). Also, the screen generation processing unit 13 assigns function buttons to the next group (third group) (step 116). Lastly, the screen generation processing unit 13 assigns operation buttons corresponding to processes not included in the job to the most-inferior group (fourth group) (step 117). In this way, by dividing the respective operation buttons into groups and arranging the first to fourth groups in order of superiority, a file operation screen corresponding to the file selected by the user is generated (step 118). In this way, a file operation screen as exemplified in FIG. 5 is generated. Subsequently, the display control unit 15 causes the user interface unit 14 to display the generated file operation screen.

In FIG. 5, a Print button and a Forward to PC button are assigned into a first group 41, an Extract Difference button is assigned into a second group 42, a Delete button is assigned into a third group 43, a Send to Email button and a Rename button are assigned into a fourth group 44, and the respective operation buttons are arranged accordingly. However, the configuration and grouping of the operation buttons exemplified in FIG. 5 is merely an example, and not limited thereto. Also, FIG. 5 clearly illustrates the groupings by drawing lines between the groups 41 to 44, but this is also one example, and the groupings may also be distinguished by making attributes such as the sizes and colors of the operation buttons different between adjacent groups, for example. Also, the order within each group may be decided as appropriate.

As exemplified in FIG. 5, in the present exemplary embodiment, the operation buttons corresponding to processes that have not ended normally from among the processes included in a job are placed into the most-superior group. If the user causes the file operation screen to be displayed, it can be inferred easily that the user wants to execute a processes that has not ended normally. In other words, it can be inferred that there is a relatively high probability of a corresponding operation button being selected. For this reason, in the present exemplary embodiment, operation buttons corresponding to processes that have not ended normally are collectively arranged into a superior part of the screen to be selected easily. Also, processes that have ended normally from among the processes included in a job are considered to have a relatively low probability of being executed compared to the processes that have not ended normally, and thus are displayed inferior to the first group.

Also, since processes that are not included in the job are unlikely to be selected, the corresponding operation buttons are displayed collectively inferior to the first group, and in the present exemplary embodiment, in the most-inferior group. Alternatively, such processes may also not be displayed.

In addition, in the present exemplary embodiment, function buttons are arranged into the third group, and are grouped superior to the processes not included in the job, but may also be arranged inferior thereto. In other words, the third and fourth groups may also be transposed.

Also, as described earlier, in a case in which a process that has not ended normally exists, there is a relatively high probability of the process being executed. Consequently, deletion of the file used by that process is not preferable. For this reason, it is appropriate to arrange and display the Delete button at an inferior position in the third group or inferior to the most-inferior group, so the Delete button is not selected by the user.

Note that FIG. 5 illustrates an example of displaying operation buttons arranged in a vertical line on the screen. Consequently, "superior" means the upper part of the screen. However, the operation buttons are not necessarily arranged in a vertical line, depending on the screen layout. In other words, a "superior" position referred to in the present exemplary embodiment means a position that is easily visible to the user and easily selectable by the user, and refers to giving a superior group more priority in being arranged at such a position. For example, in a case in which the operation buttons are arranged in the horizontal direction on the screen, the operation buttons in the most-superior group are arranged on the left side of the screen. "Inferior" positions may be interpreted similarly. In other words, an "inferior" position refers to a position that is less easily visible to the user and less easily selectable by the user.

As described above, in the present exemplary embodiment, the execution result of each process included in a job is referenced, and in accordance with whether or not each process has ended normally, a file operation screen is generated so that operations on a file can be performed easily. With this arrangement, it becomes possible to control operations performed on a file.

Figure 6B:
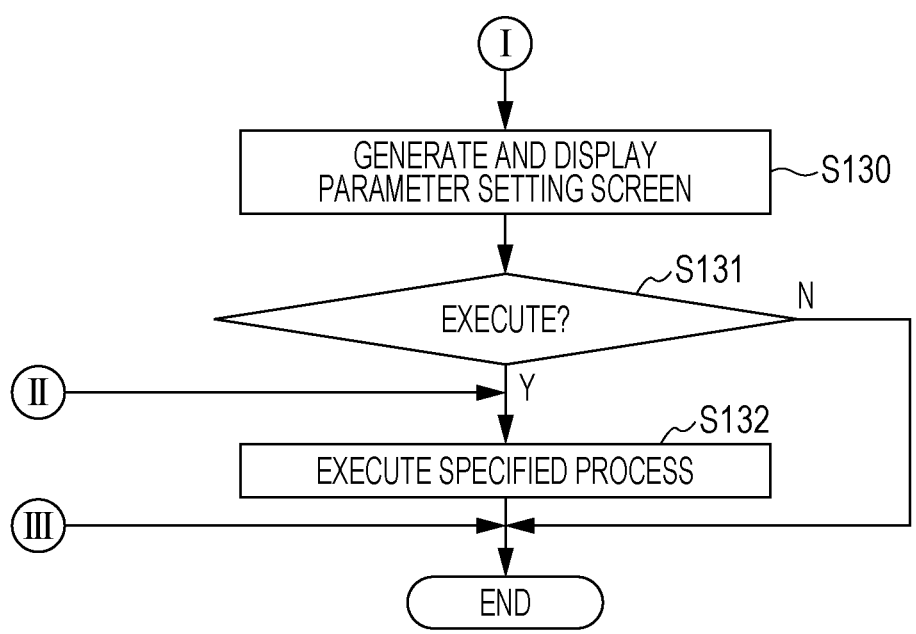
FIG. 6B is a flowchart continuing on from FIG. 6A.

After a file operation screen corresponding to a file is generated as above, the user selects some operation button from the file operation screen to indicate an operation to perform on the file. Hereinafter, a process when an operation button is operated, which is executed when the user selects an operation button, will be described using the flowcharts illustrated in FIGS. 6A and 6B.

When the user selects a desired operation button from the file operation screen displayed on the operation panel 33, the user interface unit 14 receives the operation button (step 121). In the case in which the operated operation button is included in the first or second group, or in other words, in the case of an operation button corresponding to a process included in the job (step 122, Y), and additionally in the case in which the operation button is an operation button corresponding to a process for which an error has occurred during the execution of the job (step 123, Y), the control unit 17 acquires the error message explaining the error (step 124). Additionally, in the case in which the error is resolvable from an application (step 125, Y), the screen generation processing unit 13 acquires link information for the application that resolves the error (step 126).

To describe the process in detail, in the present exemplary embodiment, there is stored in advance information associating together error identification information (an error ID) that identifies an error, an error message that explains the error, and in the case in which the error is resolvable by an application, information enabling the user to resolve the error (the above link information). The information enabling the user to resolve the error refers to information explaining a method of resolving the error. For example, information such as link information (for example, a Uniform Resource Locator (URL)) for launching an application able to resolve the error is set. In other words, if the user selects the URL, an application is launched and a settings screen or hint information for resolving the error is displayed or the like. For example, if a Simple Mail Transfer Protocol (SMTP) server error has occurred when sending email, a link that displays an SMTP server settings screen for network settings is displayed on a confirmation screen.

If link information enabling the resolution of the error is acquired as above, the screen generation processing unit 13 generates a confirmation screen including the error message and link information, or in a case in which the error is not resolvable from an application (step 125, N), the screen generation processing unit 13 generates a confirmation screen without including information related to the error, and the display control unit 15 causes the generated confirmation screen to be displayed (step 127).

Figure 7:
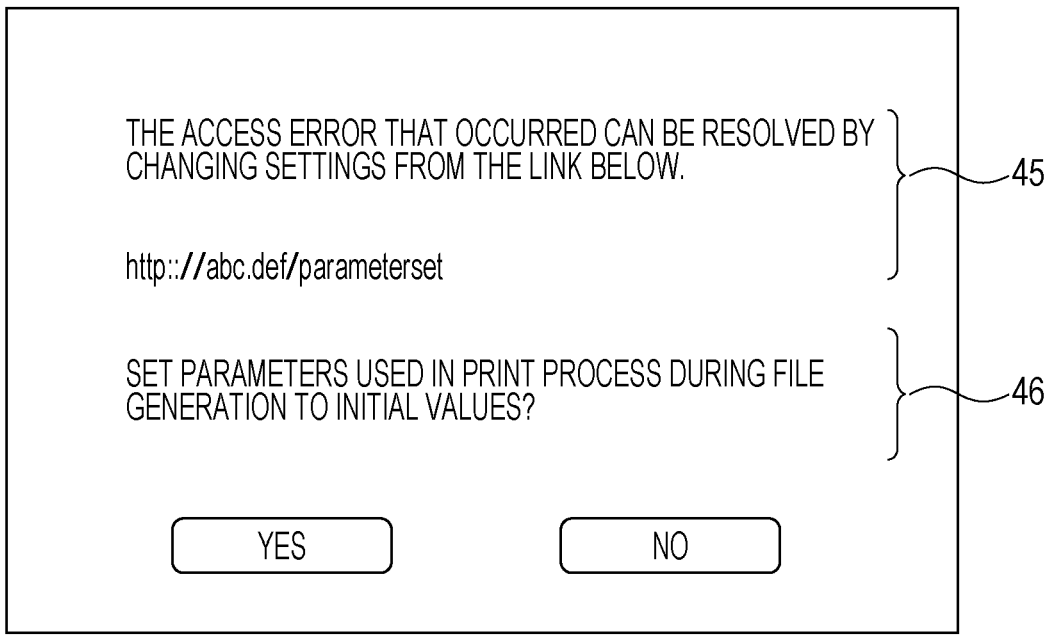
FIG. 7 is a diagram illustrating an example of a parameter query screen presenting error information according to an exemplary embodiment.

FIG. 7 is a diagram illustrating an example of a confirmation screen according to the present exemplary embodiment. In the present exemplary embodiment, before executing a process corresponding to an operated operation button, a confirmation screen prompting the user to confirm whether or not to execute the process is displayed. In the present exemplary embodiment, this confirmation screen is given functions other than the above. One such function is to display information 45 related to the error described above. In other words, if the error that occurred is resolvable by the user, such information is presented.

Figure 8:
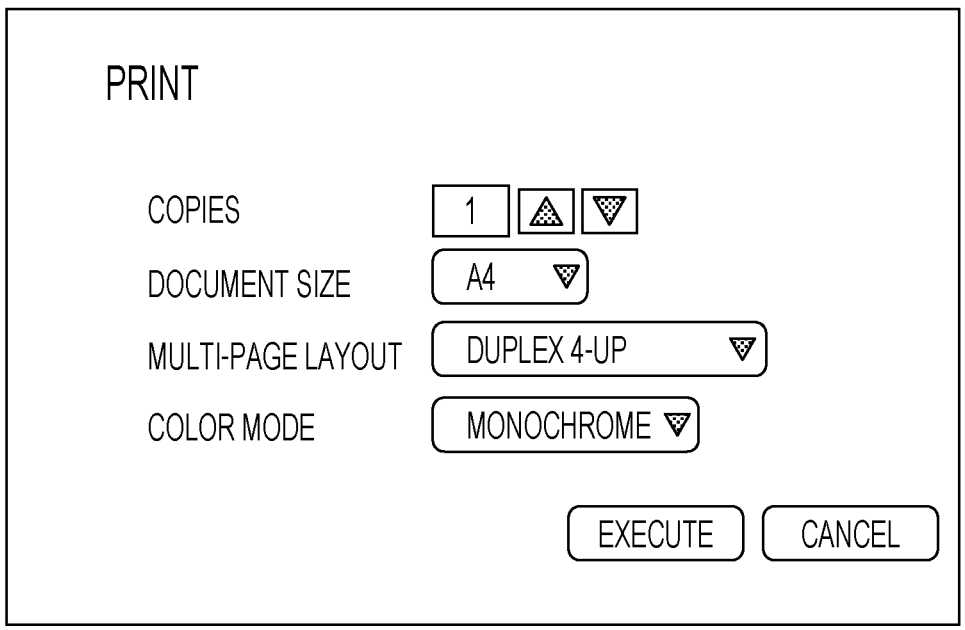
FIG. 8 is a diagram illustrating an example of a parameter setting screen according to an exemplary embodiment.

Furthermore, on the confirmation screen, the initial values of parameters are selectable. For example, in a case in which parameter values are specified when executing a process included in a job, the job execution control unit 12 saves the parameter values specified by the user in the job execution history information storage unit 23. Subsequently, in a case in which parameter values are saved in the job execution history information storage unit 23 in association with a process selected from the file operation screen, the screen generation processing unit 13 includes a message 46 on the confirmation screen to query the user about whether or not to use the parameter values as initial values. In the case in which a "Yes" button is selected in response to the query, or in other words, in the case in which the user chooses to use the parameter values specified during the execution of the job as initial values (step 128, Y), the screen generation processing unit 13 extracts and acquires the parameter values from the job execution history information storage unit 23 (step 129). Subsequently, a parameter setting screen as exemplified in FIG. 8 is generated, and the display control unit 15 causes the generated parameter setting screen to be displayed (step 130). On the parameter setting screen, parameter values specified during the execution of the job are set and displayed. On the other hand, in the case in which a "No" button is selected from the confirmation screen, or in other words, in the case in which the user chooses not to use the parameter values specified during the execution of the job as initial values (step 128, N), the screen generation processing unit 13 sets parameter values prepared in advance as the default values for the process on the parameter setting screen.

Subsequently, if the user sets desired parameter values from the parameter setting screen and gives an instruction to execute the process by selecting an Execute button (step 131, Y), the control unit 17 causes the job execution control unit 12 to execute the relevant process (step 132).

With the above arrangement, the process selected by the user is executed, and the execution result (end state) of the process is recorded in the process execution history information storage unit 24. Meanwhile, since history information during the execution of a job is accumulated in the job execution history information storage unit 23, the end state in the case of executing a process selected from the file operation screen is recorded separately in the process execution history information storage unit 24. For this reason, in step 123, it is desirable to reference both the job execution history information storage unit 23 and the process execution history information storage unit 24 to determine whether or not an error has occurred.

In a case in which the operation button operated by the user from the file operation screen is not included in the first or the second group, or in other words, in the case of an operation button corresponding to a process not included in the job (step 122, N) or the case in which the operation button is the Delete button for deleting the file being operated upon (step 133, Y), and additionally in the case in which the process corresponding to the operation button has produced an error during the execution of the job (step 134, Y), the screen generation processing unit 13 generates a delete confirmation screen separately from a delete execution screen prepared in advance by the image forming device 10, and causes the generated delete confirmation screen to be displayed (step 135). FIG. 9 illustrates an example of the delete confirmation screen generated by the screen generation processing unit 13. FIG. 9 is an example of a case in which the print process has been selected by the user, and even though the printing of a file has not been successful, the user is attempting to delete the file. Thus, in the present exemplary embodiment, a delete confirmation screen for confirmation by the user is generated and displayed. In the case in which the user selects the "Yes" button from this screen, or in other words, in the case of indicating to delete the file (step 136, Y), the display control unit 15 causes a delete execution screen prepared in advance by the image forming device 10 to be displayed (step 137). FIG. 10 illustrates an example of the delete execution screen.

In the case in which the user selects a delete execution button from the delete execution screen (step 138, Y), the file management unit 16 deletes the file at that time (step 132).

On the other hand, in the case in which the user has selected the Delete button from the file operation screen but wants to cancel the deletion (step 136, N and step 138, N), the current process ends without deleting the file.

Additionally, in the case in which an operation button other than the Delete button and corresponding to a process not included in the job is selected by the user from the file operation screen (step 133, N), the control unit 17 causes the process corresponding to the selected operation button to be executed (step 115). Alternatively, a case of not performing any process may also occur when no process is performed on a file.

As described above, according to the present exemplary embodiment, it becomes possible to apply a selected process to a selected file.

Meanwhile, the example of the job described earlier is described by taking the example of the case of outputting a file that includes an execution result of a process by printing, forwarding to a PC, or the like. Consequently, it is anticipated that the file generated during the execution of the job is to be used as-is. However, in some cases, a file is generated as an intermediate product over the course of executing a job (a file that includes an execution result from the standpoint of the process), and this generated file is used further to generate a separate file as the final product (the execution result of the job). For example, the following teaching assistance service is anticipated.

Suppose that a job for realizing such a service includes the following series of processes: a scanning process that creates an electronic file by scanning answer sheets collected from students, a master file generating process that generates a master file to act as a basis for grading, a grading process that grades the answer sheets on the basis of the master file, a return file generating process that generates, for each student, a return file including the graded result, and a process of delivering each return file to each student.

Herein, although the master file is a file that includes the execution result of the process from the standpoint of the master file generating process, the master file is merely an intermediate product from the standpoint of the job. Meanwhile, the return files are files that include the execution result of the process from the standpoint of the return file generating process, are the final product from the standpoint of the job, and correspond to a file that includes the execution result of the job.

In such a job, suppose that an inexpedience is discovered in the master file, making it desirable to conduct the master file generating process again. Accordingly, all of the return files become invalid, making it desirable to delete the invalid return files. Note that in the above description, a single file is selected from the file management screen exemplified in FIG. 4, but by making it possible to select multiple files to be operated upon, it becomes possible to delete all of the return files at once.

To execute the master file generating process again, it is sufficient to select the corresponding operation button from the file operation screen, and perform a process so that the revised master file can be generated. In addition, by subsequently executing the return file generating process again, it becomes possible to obtain appropriate return files. In this way, according to the present exemplary embodiment, operations on a file that acts as an intermediate product are also controllable.

Note that in the present exemplary embodiment, processes which are included in a job and which conduct operations on a file are executable from the file operation screen. However, processes that meet a certain condition may also be made unavailable for execution from the file operation screen. For example, in the case in which a file generated by the execution of a job is a no-copy file, repeated execution from the file operation screen may be made unavailable. Specifically, corresponding operation buttons may be displayed as non-selectable, or may be hidden. Also, for a process with a high security level, execution by a user with a relatively low security level is prohibited.

Additionally, instead of prohibiting operation in the case in which the condition is not met, a confirmation screen (warning screen) may be displayed to prompt the user to make a decision.

Note that although the present exemplary embodiment describes the image forming device 10 as an example of an information processing device, the information processing device is not limited thereto, and is also applicable to another device such as a PC or a tablet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
    a controller that
        references a job history, the job history including data about an execution of a job that generated a file including information about a parameter value set during execution of the job, and
        controls a subsequent operation on the file generated by execution of the job based on the job history by referencing the information about the parameter value and controlling the operation on the file using the parameter value set during execution of the job;
    a query unit that queries a user about whether or not to use as an initial value for a subsequent operation the parameter value set during execution of a process corresponding to an operation element selected by the user from a displayed file operation screen for performing an operation on the file as part of the execution of the job;
    a parameter setting screen generation processor that generates a parameter setting screen with the parameter value set as the initial value, if usage of the parameter value as the initial value is selected in response to the query by the query unit; and
    a display controller that controls a display of the parameter setting screen.

2. The information processing device according to claim 1, wherein
    the controller controls the operation on the file in accordance with whether or not the job has ended normally.

3. The information processing device according to claim 2, further comprising:

a display controller that differentiates content to be displayed on a file operation screen for performing the operation on the file, in accordance with whether or not the job has ended normally.

4. The information processing device according to claim 3, wherein
if a process that has not ended normally exists in the job, the display controller arranges an operation element corresponding to the process that has not ended normally in a superior position on the file operation screen.

5. The information processing device according to claim 4, wherein
if a process that has not ended normally exists in the job, the display controller arranges an operation element for deleting the file in an inferior position on the file operation screen.

6. The information processing device according to claim 5, wherein
the display controller arranges an operation element corresponding to a process not included in the job in a position inferior to the operation element corresponding to the process that has not ended normally.

7. The information processing device according to claim 1, further comprising:
a job history information acquisition unit that acquires job history information including an execution result of a process included in the job;
a confirmation screen generation processor that, if a process corresponding to an operation element selected by a user from a displayed file operation screen for performing an operation on the file has produced an error during execution of the job, generates a confirmation screen indicating a content of the error and a method of resolving the error; and
a display controller that controls a display of the confirmation screen.

8. The information processing device according to claim 7, wherein
in a case in which the produced error is resolvable by causing an application to be executed, the confirmation screen generation processor includes link destination information linking to the application on the confirmation screen.

9. The information processing device according to claim 7, wherein
a recording unit that, if the operation element corresponding to the process that has produced an error is selected from the file operation screen, thereby causing the process to be executed and end normally, records an indication that the process has ended normally, wherein
the confirmation screen generation processor does not generate the confirmation screen in a case of successfully confirming from the recording by the recording unit that the process that has produced an error has ended normally.

10. A non-transitory computer-readable medium storing a program causing a computer to execute a process for processing information, the process comprising:
referencing a job history, the job history including data about an execution of a job that generated a file including information about a parameter value set during execution of the job;
controlling a subsequent operation on the file generated by execution of the job based on the job history by referencing the information about the parameter value and controlling the operation on the file using the parameter value set during execution of the job;
querying a user about whether or not to use as an initial value for a subsequent operation the parameter value set during execution of a process corresponding to an operation element selected by the user from a displayed file operation screen for performing an operation on the file as part of the execution of the job;
generating a parameter setting screen with the parameter value set as the initial value, if usage of the parameter value as the initial value is selected in response to the query by the query unit; and
controlling a display of the parameter setting screen.

* * * * *